US006821627B2

(12) United States Patent
Stirniman et al.

(10) Patent No.: US 6,821,627 B2
(45) Date of Patent: Nov. 23, 2004

(54) PLANARIZATION AND CORROSION PROTECTION OF PATTERNED MAGNETIC MEDIA

(75) Inventors: Michael Stirniman, Fremont, CA (US); Li-Ping Wang, Fremont, CA (US); Gary Rauch, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/714,854

(22) Filed: Nov. 18, 2003

(65) Prior Publication Data

US 2004/0101715 A1 May 27, 2004

Related U.S. Application Data

(62) Division of application No. 09/871,742, filed on Jun. 4, 2001, now Pat. No. 6,680,079.
(60) Provisional application No. 60/208,743, filed on Jun. 2, 2000.

(51) Int. Cl.$^7$ .............................................. G11B 5/725
(52) U.S. Cl. .................................. 428/421; 428/694 TP; 428/694 TC; 428/694 TF; 428/694 SG
(58) Field of Search .......................... 428/421, 694 TP, 428/694 TC, 694 TF, 694 SG

(56) References Cited

U.S. PATENT DOCUMENTS

| | | |
|---|---|---|
| 3,025,279 A | 3/1962 | Barr |
| 3,104,983 A | 9/1963 | Tarwater et al. |
| 3,810,874 A | 5/1974 | Mitsch et al. |
| 3,814,741 A | 6/1974 | Caporiccio et al. |
| 4,132,681 A | 1/1979 | Field et al. |
| 4,404,247 A | 9/1983 | Burguette et al. |
| 4,446,193 A | 5/1984 | Afzali-Ardakani et al. |
| 4,486,500 A | 12/1984 | Naruo et al. |
| 4,526,833 A | 7/1985 | Burguette et al. |
| 4,543,275 A | 9/1985 | Akashi et al. |
| 4,569,962 A | 2/1986 | Burguette et al. |
| 4,588,656 A | 5/1986 | Kitamoto et al. |
| 4,642,246 A | 2/1987 | Janssen et al. |
| 4,645,703 A | 2/1987 | Suzuki et al. |
| 4,671,999 A | 6/1987 | Burguette et al. |
| 4,681,925 A | 7/1987 | Strepparola et al. |
| 4,686,146 A | 8/1987 | Karle et al. |
| 4,699,835 A | 10/1987 | Takeuchi et al. |
| 4,701,375 A | 10/1987 | Nishimatsu et al. |
| 4,705,699 A | 11/1987 | Burguette et al. |
| 4,721,640 A | 1/1988 | Kato et al. |
| 4,758,471 A | 7/1988 | Arioka et al. |
| 4,828,899 A | 5/1989 | Arioka et al. |
| 4,835,032 A | 5/1989 | Arioka et al. |
| 4,849,291 A | 7/1989 | Yacobucci et al. |
| 4,880,687 A | 11/1989 | Yokoyama et al. |
| 4,960,609 A | 10/1990 | Homola et al. |
| 4,992,316 A | 2/1991 | Ogawa |
| 5,030,478 A | 7/1991 | Lin et al. |
| 5,049,410 A | 9/1991 | Johary et al. |
| 5,055,359 A | 10/1991 | Tsuno et al. |
| 5,080,982 A | 1/1992 | Yamamoto et al. |
| 5,118,525 A | 6/1992 | Chino et al. |
| 5,143,787 A | 9/1992 | Frew et al. |
| 5,178,954 A | 1/1993 | Norman et al. |
| 5,188,747 A | 2/1993 | Kai et al. |
| 5,266,724 A | 11/1993 | Kai et al. |
| 5,279,877 A | 1/1994 | Uchiyama et al. |
| 5,286,534 A | 2/1994 | Kohler et al. |
| 5,331,487 A | 7/1994 | Gregory et al. |
| 5,409,738 A | 4/1995 | Matsunuma et al. |
| 5,534,322 A | 7/1996 | Ueyama et al. |
| 5,543,203 A | 8/1996 | Tani et al. |
| 5,545,478 A | 8/1996 | Lin et al. |
| 5,591,481 A | 1/1997 | Takahashi et al. |
| 5,618,617 A | 4/1997 | Uchida et al. |
| 5,631,041 A | 5/1997 | Kanzizuka et al. |
| 5,631,081 A | 5/1997 | Lin et al. |
| 5,661,618 A | 8/1997 | Brown et al. |
| 5,783,320 A | 7/1998 | Shimazaki et al. |
| 5,858,536 A | 1/1999 | Yanagisawa |
| 5,874,169 A | 2/1999 | Falcone |
| 5,912,061 A | 6/1999 | Uchida et al. |
| 5,919,560 A | 7/1999 | Nishimori |
| 6,055,139 A | 4/2000 | Ohtsuka et al. |
| 6,071,609 A | 6/2000 | Furutani et al. |
| 6,096,385 A | 8/2000 | Yong et al. |
| 6,096,694 A | 8/2000 | Tei et al. |
| 6,099,762 A | 8/2000 | Lewis |
| 6,110,584 A | 8/2000 | Hiratsuka |

OTHER PUBLICATIONS

Lee et al. May 1983 "Enhanced Tribological Performance of Rigid disk by Using Chemically Bonded Lubricant" J. Vac. Sci. Technol. A, vol. 11(3), pp. 711–714.

Tian et al. Jul. 1993 "Tribological Characteristics of Liquid Lubricant on Magnetic Disks Treated by Far–UV Radiation" J. Tribology, vol. 115, pp 400–405.

Vurens et al. Jan. 1993 "The Mechanism of Ultraviolet Bonding of Perfluoropolyether Lubricants" IEEE Transactions on Magnetics, vol. 29, pp 282–285.

*Primary Examiner*—Stevan A. Resan
(74) *Attorney, Agent, or Firm*—McDermott Will & Emery LLP

(57) ABSTRACT

A magnetic recording medium is formed with a distribution of servo-marks in the form of pits or indentations with an attendant reduction in potential corrosion and increased tribology. Embodiments providing a protective overcoat, e.g. containing carbon, over a magnetic recording medium having a servo-patterned substrate; applying a fluoropolyether comprising one or more acrylate groups on the protective overcoat by dip coating the magnetic recording medium in a solution of the fluoropolyether and polymerizing the fluoropolyether by ultraviolet radiation.

7 Claims, No Drawings

PLANARIZATION AND CORROSION PROTECTION OF PATTERNED MAGNETIC MEDIA

CROSS REFERENCE TO RELATED APPLICATIONS

This application is a divisional application of Ser. No. 09/871,742 filed Jun. 4, 2001 now U.S. Pat. No. 6,680,079, which claims priority from provisional patent application Ser. No. 60/208,743, filed 2 Jun. 2000 entitled "PLANARIZATION AND CORROSION PROTECTION OF PATTERNED MAGNETIC MEDIA" the entire disclosure of which is incorporated herein by reference. This application is related to U.S. Ser. No. 09/559,096, filed 27 Apr. 2000 entitled "ELASTOMERIC LUBRICANTS FOR MAGNETIC RECORDING MEDIA."

FIELD OF THE INVENTION

The present invention relates to magnetic recording media containing embedded servo-marks in the media and a lubricant topcoat and to a method for manufacturing such magnetic recording media. The present invention has particular applicability in forming lubricant topcoats for use in high areal recording density magnetic recording media with increased data reading speed.

BACKGROUND ART

Thin film magnetic recording disks and disk drives are conventionally employed for storing large amounts of data in magnetizable form. In operation, a typical contact start/stop (CSS) method involves a floating transducer head gliding at a predetermined distance from the surface of the disk due to dynamic pressure effects caused by air flow generated between the sliding surfaces of the transducer head and the disk. During reading and recording (writing) operations, the transducer head is maintained at a controlled distance from the recording surface, supported on a bearing of air as the disk rotates, such that the transducer head can be freely moved in both the circumferential and radially directions allowing data to be recorded on and retrieved from the surface of the disk at a desired position in a data zone.

In conventional hard disc drives, data are stored in terms of bits along tracks. In operation, the disc is rotated at relatively high speed, and the magnetic head assembly is mounted on the end of a support or actuator arm, which positions the head radially on the disc surface. If the actuator arm is held stationary, the magnetic head assembly will pass over a circular path on the disc, i.e. over a track, and information can be read from or written to that track. Each concentric track has a unique radius, and reading and writing information from or to a specific track requires the magnetic head to be located above the track. By moving the actuator arm, the magnetic head assembly is moved radially on the disc surface between tracks. Many actuator arms are rotary, wherein the magnetic head assembly is moved between tracks by activating a servomotor which pivots the actuator arm. A linear actuator may alternatively be used to move a magnetic head assembly inward or outward on the disc along a straight line.

To record information on the disc, the transducer creates a highly concentrated magnetic field in close proximity to the magnetic recording medium. During writing, the strength of the concentrated magnetic field directly under the write transducer is greater than the coercivity of the recording medium (known as "saturating" the medium), and grains of the recording medium at that location are magnetized with a direction which matches the direction of the applied magnetic field. The grains of the recording medium retain their magnetization after the saturating magnetic field is removed. As the disc rotates, the direction of the writing magnetic field is alternated based on bits of the information being stored, thereby recording a magnetic pattern on the track directly under the write transducer.

On each track, typically eight bits form a byte and bytes of data are grouped as sectors. Reading or writing a sector requires knowing the physical location of the data in the data zone so that the servo-controller of the disk drive can accurately position the read/write heads in the correct location at the correct time. Most disc drives use embedded "servo patterns" of recorded information on the disc. The servo patterns are read by the magnetic head assembly to inform the disc drive of track location. In conventional disc drives, tracks typically include both data sectors and servo patterns and each servo pattern typically includes radial indexing information, as well as a "servo burst". A servo burst is a centering pattern to precisely position the head over the center of the track. Because of the locational precision needed, writing of servo patterns requires expensive servo-pattern writing equipment and is somewhat of a time consuming process.

A conventional approach to the servo-sensing problem includes the use of phisical voids or depressions in the magnetic layer between tracks formed by stamping or otherwise physically marking a pattern on the disc to function as servo information. A magnetic material layer is then applied at a consistent thickness over the entire disc surface. When this type of disc is used, the distance from the magnetic head to magnetic material in the depressions is further than the distance from the magnetic head to magnetic material in the track. The increased distance both reduces the strength of the signal recorded in the depressions and reduces the contribution from the depressions to the magnetic field sensed by the read head.

While the depressions or voids formed in the disc are helpful in increasing track density, they tend to reduce the tribological performance of the disc assembly. For example, during operation of the magnetic recording medium, the slider no longer travels over a smooth surface, causing several mechanical performance drawbacks. The drawbacks include modulation of fly height when encountering servo patterns, fly height perturbations due to topography changes from the track width definition, glide defects from the stamping process, and disc distortion due to the servo patterning process. It is thus preferred to provide the servo pattern without surface topography.

The application of the protective layer and the topical lubricant assist in providing high durability and reliability of thin film recording media. In accordance with conventional practices, a lubricant topcoat is applied over the protective layer to prevent wear between the disk and head interface during drive operation.

Fluoropolyether lubricants are of particular interest in lubricating magnetic recording media. These lubricants are uniquely suited to form lubricant topcoats on magnetic media because of such properties as chemical inertness, low vapor pressure, low surface tension, high thermal stability, stability under high shear stress and good boundary lubrication properties. Among the many lubricants available, liquid perfluoropolyethers (PFPE) are the most typically used in forming topcoat lubricants on magnetic recording media.

Liquid lubrication of the disk surface encounters several problems, however, which limit its effectiveness as used in rotating storage media. For example, it is well known that non-bonded lubricants will spin off a thin film disk with a carbon overcoat. Typically, PFPE lubricants do not have a retention means so that when the disk rotates, the lubricant tends to spins off the disk. The depletion of the lubricant from the disk surface increases the friction between the disk and the read/write head.

Further, the depletion of the lubricant results in non-uniformity across the surface of the disk resulting in additional operational difficulties. For example, where the thickness is too thin, the head can cause wear on the disk surface and where the lubricant thickness is too great, the head will become stuck in the lubricant (from static friction) and the head or disk could be damaged when the head suddenly becomes unstuck due to the rotating disk.

Dominguez-Burguette et al. in U.S. Pat. No. 4,404,247 disclose anchoring a polymerizable composition directly to a metallized substrate by a complex system which includes an inner polymeric film and an outer polymeric film. The inner polymer is made from a film forming aromatic or heterocyclic polymerizable monomer and a vinyl aromatic polymer and the outer polymer contains a compound having a perfluoropolyether segment. Dominguez-Burguette et al. disclose that such a system would adequately protect a metallic thin film and teach away from the use of a hard protective coating on magnetic thin film media. Several other patents to Dominguez-Burguette et al., such as U.S. Pat. Nos. 4,526,833; 4,569,962; 4,671,999; and 4,705,699, disclose additional ingredients in creating the complex two phase polymer coating system.

Literature exists on bonding lubricants on to the surface of recording media by the application of low energy radiation. Illustrative of such art are U.S. Pat. Nos. 5,545,478 and 5,631,081 both to Lin et al., which disclose a process for bonding lubricants to magnetic media by exposing the coated media to low energy electron radiation. U.S. Pat. No. 5,030,478 to Lin et al. also discloses a process for bonding lubricants to thin film recording media by low energy radiation. U.S. Pat. No. 5,661,618 to Homola et al. approached bonding a fluoroether lubricant by exposing the lubricated disk to a plasma composed of an inert gas. These references, however, have not recognized the problems associated with patterned recording media.

Hence, a continuing need exists in the art for an improved lubricated magnetic recording medium. In particular there exists a need for a magnetic recording medium having servo-marks which occupy a reduced area of the surface of the magnetic recording medium thereby increasing available area for recording data with improved trobological performance. A need also exists for an efficient, cost-effective method of manufacturing a magnetic recording medium with a lubricant topcoat exhibiting improved tribological performance and fly-stiction.

DISCLOSURE OF THE INVENTION

An advantage of the present invention is a magnetic recording medium having a embedded servo-marks and increased areal recording density with improved corrosion and tribological performance and an efficient cost-effective method of manufacturing a magnetic recording medium having a lubricant topcoat with servo embedded magnetic recording media.

Additional advantages and other features of the invention will be set forth in the description which follows and in part will be apparent to those having ordinary skill in the art upon examination of the following or may be learned from the practice of the present invention. Advantages of the present invention may be realized and particularly pointed out in the appended claims.

According to the present invention, the foregoing and other advantages are achieved in part by a magnetic recording medium comprising a substrate having physically recorded servo-information, e.g. a distribution of pits or indentations therein to serve as servo-marks in the magnetic recording medium; and a means for lubricating the magnetic recording medium. Lubrication of the magnetic recording medium of the present invention comprises having a cross-linked fluoropolyether topcoat thereon. The cross-linked fluoropolymer topcoat advantageously forms a relatively immobile coating that serves to protect any metallic layers thereunder from corrosion and to facilitate planarization of the servo-patterned media.

Embodiments of the present invention include an underlayer on the substrate and the magnetic layer on the underlayer; the protective overcoat comprising one or more amorphous carbon layers and the cross-linked fluoropolyether topcoat comprising a cross-linked perfluoropolyalkylether directly on the one or more amorphous carbon layers.

Another aspect of the present invention is a method of reading from or writing on the magnetic recording medium comprising sensing one or more of the servo-marks in the magnetic recording medium with a read/write head; and moving the read/write head to a particular position on the magnetic recording medium in response to reading the one or more servo-marks.

A further aspect of the present invention is a method of manufacturing a magnetic recording medium. The method comprises physically forming a distribution of servo marks on a substrate or magnetic layer. The marks can be formed by any method that leaves pits, voids or other indentations in the surface of the particular layer as by stamping, laser texturing, etching, micromachining, etc. The formed distribution of pits, voids, or indentations function as servo-marks capable of being sensed to enable reading magnetically recorded servo-information in a data track and accurate positioning of a read/write head on a data zone Following the formation of the servo-information, a fluoropolyether capable of cross-linking is applied to the magnetic recording medium having a distribution of servo-marks therein and polymerized to form a cross-linked fluoropolyether topcoat lubricant.

Embodiments include forming a protective overcoat, e.g. containing carbon, over a magnetic recording medium; applying a fluoropolyether comprising one or more acrylate groups on the protective overcoat by dip coating the magnetic recording medium in a solution of the fluoropolyether and polymerizing the fluoropolyether by ultraviolet radiation, where fluoropolyether comprising a plurality of —$(C_aF_{2a}O)_n$— repeating units, wherein each subscript a is independently in each repeating unit an integer of from 1 to about 10 and n is an integer from 5 to about 100, e.g. from 5 to about 80.

Additional advantages and other features of the present invention will become readily apparent to those skilled in this art from the following the detailed description, wherein only the preferred embodiment of the present invention is shown and described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description should be regarded as illustrative in nature, not as restrictive.

DESCRIPTION OF THE INVENTION

In pattern assisted magnetic recording media, a distribution of pits or voids are stamped, etched or otherwise provided in to the surface of a magnetic recording disc prior to deposition a protective overcoat. However, it is believed that the coverage of the sidewalls of the pits or voids may be inadequate thus permitting potential corrosion issues with the underlying metal layer, particularly the magnetic layer. Additionally, it has been noted that a particular problem with patterned recording media is the reduced smoothness on the surface of the media which adversely affects the operation of the disc drive, e.g. the flyability of the read/write transducer head.

The present invention addresses these and other problems by forming a cross-linked lubricant on the surface of a patterned magnetic recording medium. The present invention contemplates applying a fluoropolyether on the surface of a patterned magnetic recording medium to substantially coat or substantially fill the voids on the surface of the media thereby improving surface smoothness and reducing the potential for corrosion of the underlying layers. The fluoropolyether applied to the surface of the media preferably comprise low molecular weight, i.e. oligomeric fluoropolyethers, such that higher mobility of such low molecular weight components permits them to flow to the inside corners of topographical features as by forming menisci therein. By polymerizing the fluoropolyether roughly in place, a topographically smoother surface having a reduced propensity for corrosion can be achieved.

In accordance with the present invention, a lubricant topcoat is formed on a protective overcoat of a magnetic recording medium having a distribution of pits, voids, or indentations therein. The magnetic recording medium of the present invention comprises a composite of a magnetic layer on a non-magnetic substrate. In an embodiment of the present invention, an underlayer such as chromium or a chromium alloy is formed between the non-magnetic substrate and the magnetic layer.

In practicing the present invention, a substrate is provided having a distribution of pits or indentations therein that serve as servo-information in the magnetic recording medium that are capable of being sensed, mechanically or electrically. The servo-information can be formed by any method that leaves a distribution of pits, voids or other indentations in the surface of the particular layer as by stamping, laser texturing, etching, micromachining, etc. as is known in the art or equivalents thereof. The servo-information enables accurate positioning of a read/write head in a given data zone, e.g. track location and track position/alignment, by the servo-controller of a conventional disc drive.

Non-magnetic substrates employed in embodiments of the present invention can be any of those employed in the manufacture of conventional magnetic recording media or their equivalents, including nickel-phosphorous plated aluminum and aluminum alloy substrates as well as alternative substrates such as glass, glass-ceramic, and ceramic materials.

A magnetic recording layer of the present invention is deposited on the patterned substrate by typical deposition techniques and includes typical magnetic recording layers as, for example, a cobalt based alloy layer, such as one or more layers comprising one or more of chromium, platinum, tantalum, niobium, tungsten with cobalt. Other magnetic layer materials contemplated by the present invention include a barium ferrite film and perpendicular recording media. The magnetic layer or layers and underlayer are deposited on the non-magnetic substrate by conventional deposition techniques, as by sputtering techniques preformed in an apparatus containing sequential deposition chambers.

In practicing the present invention, a protective overcoat is formed, e.g. by vapor deposition techniques know in the art or their equivalents, on the surface of the magnetic layer. The protective overcoat can comprise one or more layers of carbon, e.g. hydrogenated amorphous carbon or nitrogenated amorphous carbon. Hydrogenated amorphous carbon, for example, is hydrogen doped amorphous carbon, while nitrogenated amorphous carbon is nitrogen doped amorphous carbon. Other thin film materials that serve as a protective overcoat in accordance with embodiments of the present invention include silicon nitride. Embodiments of the present invention also includes dual or multiple layers serving as the protective overcoat as, for example, a bilayer of silicon nitride capped with hydrogenated carbon. The protective overcoat is formed on the magnetic medium by conventional techniques as, for example, by sputter-depositing an amorphous hydrogenated carbon film employing a plasma deposition chamber. Another description of forming a protective overcoat can be found, for example, in U.S. Pat. No. 5,945,191 to Hwang et al.

In practicing the present invention, an cross-linked lubricant topcoat is formed on the protective overcoat by applying a fluoropolyether capable of cross-linking on to the protective overcoat and polymerizing the fluoropolyether to form an topcoat lubricant overcoat. Fluoropolyethers of the present invention include homopolymers, random polymers or block polymers, i.e. the repeating units of the fluoropolyether can be the same or different. In addition, different repeat units can be randomly distributed along the backbone of the polymer or distributed as a block of one type of repeat unit and subsequent blocks of different repeat units along the backbone of the polymer. The inventive lubricants can be completely fluorinated or partially fluorinated and can be linear or branched. In an embodiment of the present invention, the fluoropolyether comprises a plurality of —$(C_aF_{2a}O)_n$— repeating units, wherein subscript a is independently in each such unit an integer of from 1 to about 10 and n is an integer from 2 to about 100. In an embodiment of the present invention n is an integer from about 5 to about 80, e.g. from about 10 to about 60.

In an embodiment of the present invention, the fluoropolyether is selected from the group consisting of Fomblin Y, Fomblin Z and Krytox lubricants, as shown below by the formulas below.

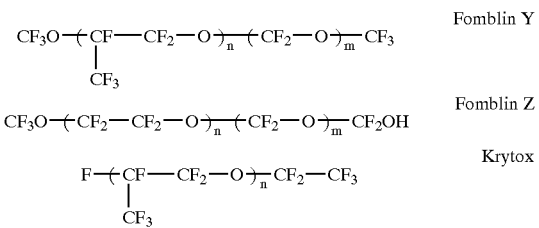

Where n and m are independently in these formulas each from about 5 to about 100, e.g. from about 10 to about 80.

In another embodiment of the present invention, the fluoropolyether containes one or more polymerizable groups, e.g., one or more acrylates. Polymerization of such a fluoropolyether results in a cross-linked lubricant topcoat on the protective overcoat. Polymerizable groups according to the present invention include those moieties that can repeatedly undergo chemical unions with themselves as, for example, vinyl groups, such as alkenes, alkynes, acrylates, acrylamides, epoxy groups, carboxyl groups, etc. Additional polymerizable fluoropolyethers can be found in U.S. Ser. No. 09/559,096, filed 27 Apr. 2000 entitled ELASTOMERIC LUBRICANTS FOR MAGNETIC RECORDING MEDIA also assigned to the present assignee, the entire disclosure of which is hereby incorporated in its entirety by reference.

In an embodiment of the present invention, the fluoropolyether lubricants have a number average molecular weight of about 1,000 to about 10,000 a.m.u., e.g., about 1,500 a.m.u. to about 6,000 a.m.u. In practicing the present invention, the fluorpolyether can be applied to a protective overcoat of a magnetic recording medium in any convenient manner, as by dip coating the medium in a solution of the lubricant in a conventional organic solvent or by applying a solution of the lubricant over the medium. Conventional spray, wipe and vapor coating techniques for applying the lubricants are also contemplated by the present invention.

In an embodiment of the present invention, the lubricant is dissolved in a conventional solvent, such as Freon, Vertrel XF or perfluorohexane (solvents available from Dupont), in a ratio of about 0.0001% to about 100% by (weight/weight), e.g. about 0.001% to about 1%. A typical magnetic recording medium, for example, a composite comprising a non-magnetic substrate having sequentially deposited on each side thereof an underlayer, a magnetic layer, and a protective carbon overcoat, is submerged in the lubricant solution and then slowly withdrawn therefrom. In practicing the present invention, one can employ a conventional lifter-type dipper to submerge the composite in the lubricant solution. One having ordinary skill in the art can easily optimize the duration of submergence and the speed of withdrawal to achieve a desired coating thickness.

In an embodiment of the present invention, a fluoropolyethers is advantageously polymerized directly on the surface of a protective overcoat of a magnetic recording medium. The fluoropolyether can be polymerized according to photochemical methods, such as ultraviolet (UV) radiation, or by bombardment with an high-energy electron beam. For example, UV radiation can be used to effect polymerization of the fluoropolyether in an inert atmosphere with or without the use of a photoinitiator. Although the rate of polymerization is enhanced by photoinitiators or sensitizers, adequate polymerization of the lubricant can be attained without their use. Further, ultraviolet radiation is particularly effective and economical for cross-linking fluoropolyether oligomers with more than one vinyl groups, e.g., multiple acrylate groups. It is possible to vary the molecular weights of the starting fluoropolyether and the number of vinyl groups to regulate the degree of cross-linking when a fluoropolyether having multiple polymerizable groups is employed to form the cross-linked topcoat lubricant.

Any convenient source of radiation can be used, e.g. a UV laser, to effect polymerization or cross-linking of the applied fluoropolyether on the patterned magnetic medium. In an embodiment of the present invention, the magnetic recording medium having polymerizable or cross-linkable fluoropolyether thereon is exposed to UV radiation from a low pressure mercury lamp UV lamp which emits radiation over the range of about 254 nm to about 185 nm. In one aspect of the present invention, the coated disc is exposed to UV radiation having an intensity of about several to about 100 or more milliwatts/cm$^2$ for an exposure duration of approximately 10 seconds to about 4 minutes or more to form a cross-liked fluorpolyether lubricant topcoat.

Magnetic recording media produced in accordance with the present invention comprises texturing opposite surface of a non-magnetic substrate to form the servo-marks and then depositing a plurality of layers on opposite surfaces. Such layers are conventional and deposited in a conventional manner. For example, embodiments of the present invention include sequentially sputter depositing on opposite sides of the substrate an underlayer, magnetic layer and protective overcoat. A lubricant topcoat is applied to the protective overcoat.

Magnetic layers deposited in accordance with the present invention can be any of those conventionally employed in the production of magnetic recording media, including cobalt alloys. Underlayers employed in the present invention can be any of those employed in manufacturing conventional magnetic recording media, such as chromium, chromium alloys, e.g., chromium-vanadium or chromium-titanium, oxygen-doped chromium, tungsten or a tungsten alloy. Protective overcoats employed in accordance with the present invention are those conventionally employed in manufacturing magnetic recording media, and typically contain carbon.

The present invention advantageously enables the formation of lubricated magnetic recording media having a plurality of servo-pits with a reduced surface topography. The present invention can be employed to produce any of various types of magnetic recording media, including thin film discs, with an attendant increase in areal recording density, reduced servo-tracking roughness and increased data-reading speed.

Only the preferred embodiment of the present invention and but a few examples of its versatility are shown and described in the present disclosure. It is to be understood that the present invention is capable of use in various other combinations and environments and is capable of changes and modifications within the scope of the inventive concept as expressed herein.

What is claimed is:

1. A magnetic recording medium comprising:
   a substrate having a distribution of pits or indentations therein to serve as servo-marks in the magnetic recording medium;
   a magnetic layer on the substrate;
   a protective overcoat on the magnetic layer; and
   a cross-linked fluoropolyether topcoat directly on the protective overcoat forming a substantially planarized medium surface.

2. The magnetic recording medium according to claim 1, further comprising an underlayer on the substrate and the magnetic layer on the underlayer.

3. The magnetic recording medium according to claim 2, wherein the protective overcoat comprises carbon.

4. The magnetic recording medium according to claim 1, wherein the cross-linked fluoropolyether topcoat comprises a cross-linked perfluoropolyalkylether.

5. The magnetic recording medium according to claim 1, wherein the protective overcoat comprises one or more amorphous carbon layers and wherein the cross-linked fluoropolyether topcoat comprises a cross-linked perfluoropolyalkylether directly on the one or more amorphous carbon layers.

6. A method of reading from or writing on the magnetic recording medium defined in claim 1, the method comprising:
   sensing one or more of the servo-marks in the magnetic recording medium with a read/write head; and
   moving the read/write head to a particular position on the magnetic recording medium in response to reading the one or more servo-marks.

7. A magnetic recording medium, comprising:
   a magnetic layer on a substrate having a distribution of pits or indentations therein; and
   means for lubricating and forming a substantially planarized surface on the magnetic recording medium.

* * * * *